United States Patent
Miyamoto et al.

(10) Patent No.: US 10,033,116 B2
(45) Date of Patent: Jul. 24, 2018

(54) TERMINAL, TERMINAL-EQUIPPED ELECTRICAL WIRE, AND METHOD FOR MANUFACTURING TERMINAL-EQUIPPED ELECTRICAL WIRE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Kenji Miyamoto, Mie (JP); Takanobu Shimada, Mie (JP); Toshiya Ota, Mie (JP); Tatsuo Tamagawa, Mie (JP)

(73) Assignees: AUTONETWORKS TECHNOLOGIES, LTD. (JP); SUMITOMO WIRING SYSTEMS, LTD. (JP); SUMITOMO ELECTRIC INDUSTRIES, LTD. (JP)

( * ) Notice: Subject to any disclaimer, the term of this patent is extended or adjusted under 35 U.S.C. 154(b) by 168 days.

(21) Appl. No.: 14/785,764

(22) PCT Filed: Apr. 22, 2014

(86) PCT No.: PCT/JP2014/061243
§ 371 (c)(1),
(2) Date: Oct. 20, 2015

(87) PCT Pub. No.: WO2014/181677
PCT Pub. Date: Nov. 13, 2014

(65) Prior Publication Data
US 2016/0072199 A1   Mar. 10, 2016

(30) Foreign Application Priority Data
May 7, 2013   (JP) .................................. 2013-097430

(51) Int. Cl.
H01R 9/00 (2006.01)
H01R 4/02 (2006.01)
(Continued)

(52) U.S. Cl.
CPC ............. *H01R 4/029* (2013.01); *B23K 20/10* (2013.01); *H01R 4/023* (2013.01); *H01R 43/0207* (2013.01); *H01R 43/0249* (2013.01)

(58) Field of Classification Search
CPC ........ H01R 9/05; H01R 9/038; H01R 9/0512; H01R 13/6471; H01R 13/6582
(Continued)

(56) References Cited

U.S. PATENT DOCUMENTS 3,588,791 A * 6/1971 Polidori ............... H01R 4/5083
174/71 R
5,724,730 A * 3/1998 Tanaka ............ B29C 45/14639
174/76
(Continued)

FOREIGN PATENT DOCUMENTS

CA 102195171 9/2011
JP 2009-26677 2/2009
(Continued)

OTHER PUBLICATIONS

International Search Report.

*Primary Examiner* — William H Mayo, III
(74) *Attorney, Agent, or Firm* — Gerald E. Hespos; Michael J. Porco; Matthew T. Hespos

(57) ABSTRACT

A terminal (20) includes a connecting portion (24) to which a plurality of wires (11, 12) including conductors (13, 14) having different thicknesses are to be connected side by side, and the connecting portion (24) is stepped. A terminal-wire assembly (10) includes a plurality of wires (11, 12) including conductors (13, 14) having different thicknesses and a terminal (20) including a connecting portion (24) to which
(Continued)

the plurality of wires (11, 12) are to be connected side by side, and the connecting portion (24) is stepped. In the terminal-wire assembly (10), the wire (12) connected at a high position on the connecting portion (24) includes the thinner conductor (14) than the wire (11) connected at a low position on the connecting portion (24).

5 Claims, 6 Drawing Sheets

(51) Int. Cl.
*B23K 20/10* (2006.01)
*H01R 43/02* (2006.01)

(58) Field of Classification Search
USPC ....... 174/74 R, 77 R, 84 R, 88 R, 84 C, 494, 174/493, 499
See application file for complete search history.

(56) References Cited

U.S. PATENT DOCUMENTS

| | | | | |
|---|---|---|---|---|
| 5,780,774 A | * | 7/1998 | Ichikawa | H01R 12/61 174/117 FF |
| 6,444,910 B1 | * | 9/2002 | Goto | H01R 4/70 174/117 F |
| 7,339,114 B2 | * | 3/2008 | Tachibana | B23K 11/0033 174/84 C |
| 9,153,884 B2 | * | 10/2015 | Tajiri | H01R 9/05 |
| 2003/0064625 A1 | * | 4/2003 | Ozai | H01R 9/032 439/579 |
| 2008/0265004 A1 | * | 10/2008 | Stroh | B23K 20/10 228/110.1 |
| 2009/0029587 A1 | | 1/2009 | Miyazaki et al. | |
| 2011/0198122 A1 | | 8/2011 | Sagawa et al. | |

FOREIGN PATENT DOCUMENTS

| | | |
|---|---|---|
| JP | 2011-159461 | 8/2011 |
| JP | 2011-192638 | 9/2011 |
| JP | 2012-221831 | 11/2012 |
| JP | 2013-25932 | 2/2013 |
| WO | 2013/011847 | 1/2013 |

* cited by examiner

TERMINAL, TERMINAL-EQUIPPED ELECTRICAL WIRE, AND METHOD FOR MANUFACTURING TERMINAL-EQUIPPED ELECTRICAL WIRE

BACKGROUND

1. Field of the Invention

The present invention relates to a terminal, a terminal-wire assembly and a method for manufacturing a terminal-wire assembly.

2. Description of the Related Art

In wiring of an automotive vehicle or the like, a terminal-wire assembly formed by connecting two or more wires to one terminal is used in some cases. Such a terminal-wire assembly is known, for example, from Japanese Unexamined Patent Publication No. 2011-192638.

In Japanese Unexamined Patent Publication No. 2011-192638, a terminal-wire assembly is provided in which one wire is connected to each of front and back surfaces of a plate-like terminal.

In the case of connecting a plurality of thick wires to one terminal, a connected state of the previously connected wire may be adversely affected by ultrasonic welding vibration if the wires are connected one by one to the terminal.

To avoid such a problem, it is considered to arrange a plurality of wires side by side and weld them at once. However, if a plurality of wires including conductors having different thicknesses are connected, ultrasonic waves are concentrated on the wire having a thicker conductor and the connection of the wire having a thinner conductor tends to be incomplete.

The present invention was completed based on the above situation and aims to provide a terminal, to which a plurality of wires having different thicknesses are equally connectable, and a terminal-wire assembly.

SUMMARY

To solve the above problem, the present invention is directed to a terminal with a connecting portion to which a plurality of wires including conductors having different thicknesses are to be connected side by side, wherein the connecting portion is stepped.

Further, the present invention is directed to a terminal-wire assembly with a plurality of wires including conductors having different thicknesses and a terminal including a connecting portion to which the plurality of wires are to be connected side by side, wherein the connecting portion is stepped.

Furthermore, the present invention is directed to a method for manufacturing a terminal-wire assembly with a plurality of wires including conductors having different thicknesses and a terminal including a connecting portion to which the plurality of wires are to be connected side by side, wherein the connecting portion is stepped, and a welding step is performed with the wire including the thinner conductor than the wire to be arranged at a low position on the connecting portion arranged at a high position on the connecting portion.

Since the connecting portion of the terminal is stepped in the present invention, the wire including the thick conductor is arranged at the low position on the connecting portion if the wire including the thicker conductor than the wire to be arranged at the low position on the connecting portion is arranged at the high position on the connecting portion, whereby a step between welding surfaces (surfaces on a side opposite to the terminal) of the wire including the thinner conductor and the wire including the thicker conductor is made smaller and welding can be evenly applied.

Hence, according to the present invention, a difference between compression ratios (cross-sectional area of the conductor after welding/cross-sectional area of the conductor before welding) of the wires can be made smaller than when a plurality of wires including conductors having different thicknesses are arranged side by side and welded on a terminal including a connecting portion in the form of a flat plate. As a result, according to the present invention, it is possible to provide the terminal, to which the plurality of wires including the conductors having different thicknesses are equally connectable, and the terminal-wire assembly.

In the terminal-wire assembly of the present invention, the plurality of wires including the conductors having different thicknesses are connected to the connecting portion by ultrasonic welding.

In the method for manufacturing a terminal-wire assembly of the present invention, ultrasonic welding is simultaneously applied to all the wires.

If the above configurations are adopted, a plurality of wires can be connected by a simple and low-cost method.

According to the present invention, it is possible to provide a terminal, to which a plurality of wires having different thicknesses are equally connectable, and a terminal-wire assembly.

DETAILED DESCRIPTION

One embodiment of the present invention is described with reference to FIGS. 1 to 8.

Figure 1:
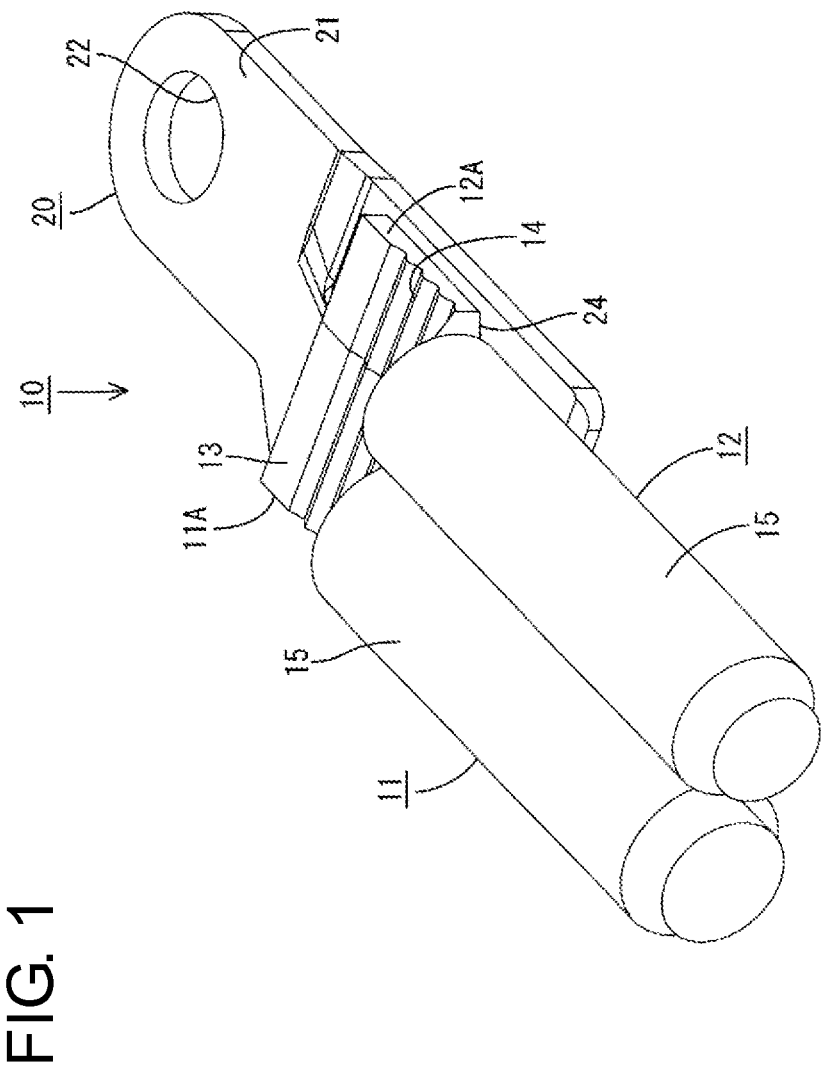
FIG. 1 is a perspective view of a terminal-wire assembly of one embodiment.
Figure 2:
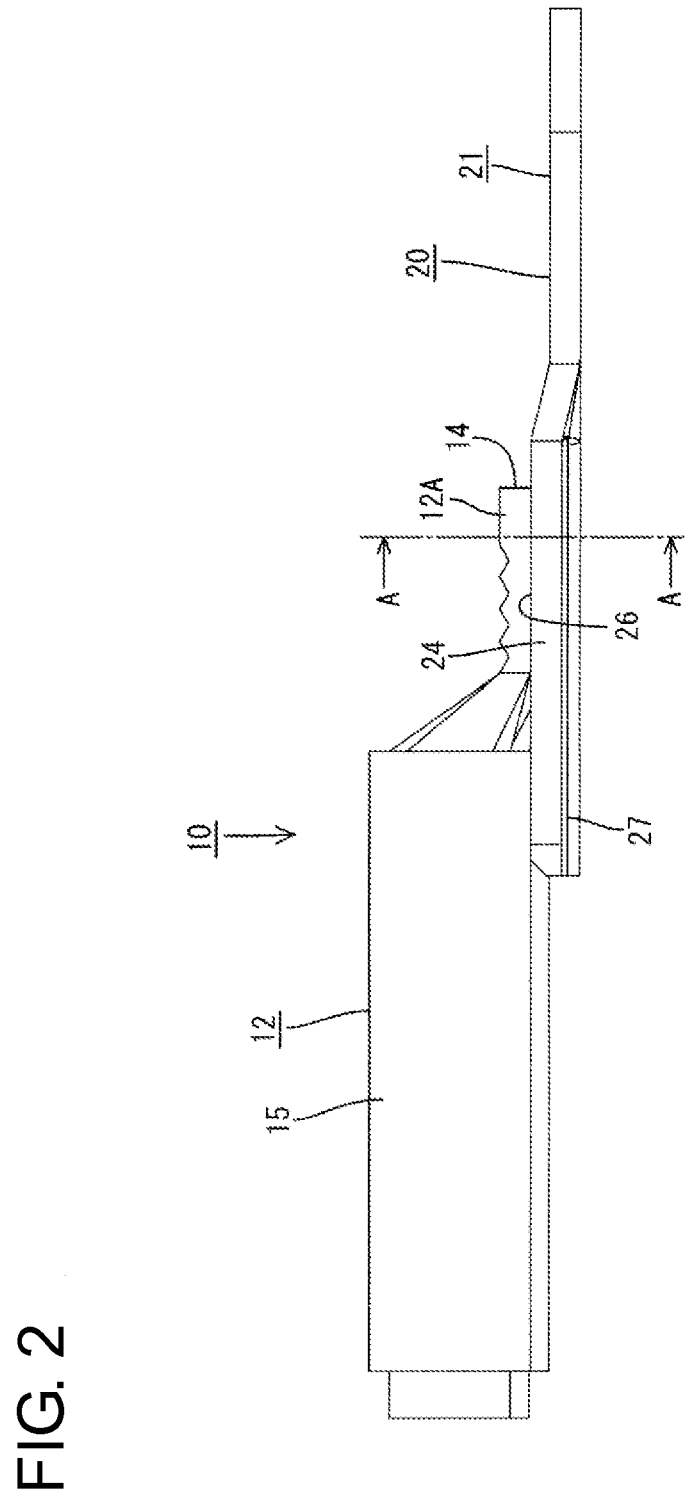
FIG. 2 is a side view of the terminal-wire assembly.

A terminal-wire assembly 10 of this embodiment is, as shown in FIG. 1, composed of a plurality of (two in this embodiment) wires 11, 12 and a terminal 20 to which ends 11A, 12A of the plurality of wires 11, 12 are to be connected side by side. In the following description, a vertical direction is based on FIG. 2 and left and right sides of FIG. 2 are referred to as rear and front sides concerning a front-back direction.

Each wire 11, 12 is, as shown in FIG. 1, such that a conductor 13, 14 is covered around with an insulation coating 15 made of synthetic resin. At the end 11A, 12A of the wire 11, 12, the insulation coating 15 is peeled and removed to expose the conductor 13, 14.

The conductor 13, 14 is a twisted wire obtained by twisting a multitude of (plurality of) metal strands. The conductor 13, 14 (metal strands) is made of a metal material such as aluminum, aluminum alloy, copper or copper alloy. A cross-sectional shape of each wire 11, 12 is substantially circular (see FIG. 7).

Thicknesses of the conductors 13, 14 of the two wires 11, 12 differ. Out of the two wires 11, 12, the wire 11 having the thicker conductor 13 is referred to as a first wire 11 and the wire 12 having the conductor 14 thinner than that of the first wire 11 is referred to as a second wire 12.

The terminal is formed of a plate member made of metal such as copper, copper alloy, aluminum or aluminum alloy. Note that surfaces of the metal plate member constituting the terminal 20 may be plated if necessary.

The terminal 20 is composed of a terminal connecting portion 21 in the form of a flat plate to be connected to a mating terminal (not shown) and a wire connecting portion (example of a connecting portion) connected behind the terminal connecting portion 21 and having the wires 11, 12 connected thereto. A terminal connection hole 22 for connecting the mating terminal is provided substantially in a central part of the terminal connecting portion 21.

Figure 3:
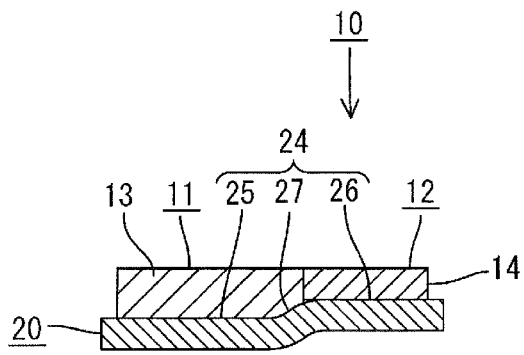
FIG. 3 is a section along A-A of FIG. 2.
Figure 4:
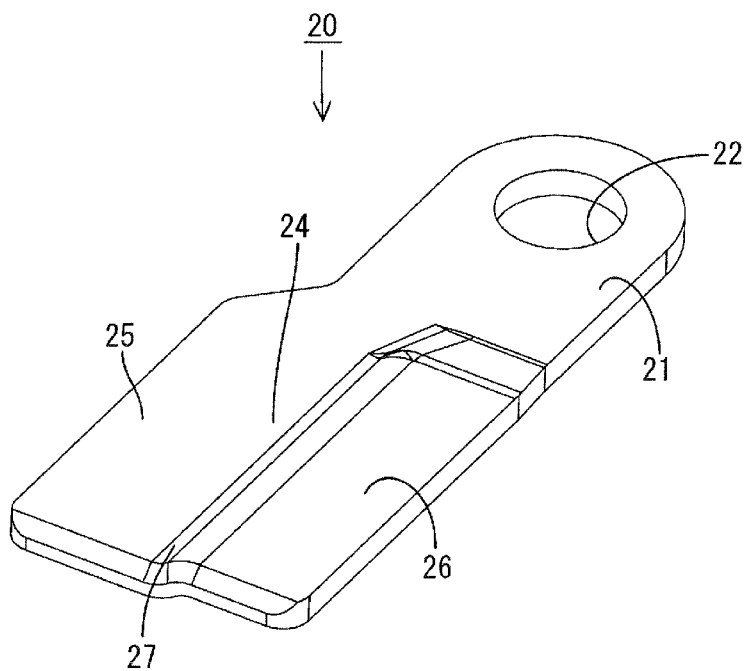
FIG. 4 is a perspective view of a terminal.
Figure 5:
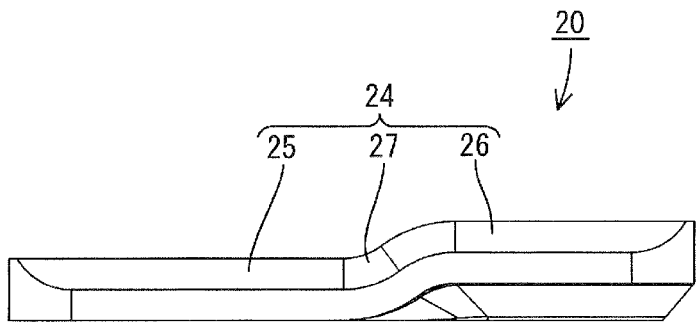
FIG. 5 is a rear view of the terminal.
Figure 6:
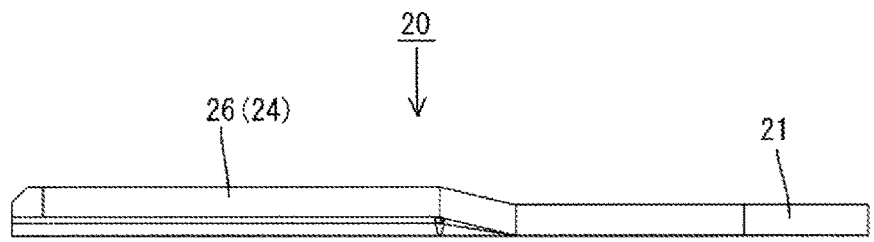
FIG. 6 is a side view of the terminal.

As shown in FIGS. 3 to 5, the wire connecting portion 24 of the terminal 20 is stepped. In this embodiment, the stepped wire connecting portion 24 is formed by working a part connected behind the terminal connecting portion 21 in the form of a flat plate into a stepped shape.

A left area (first connection area 25) of the wire connecting portion 24 shown in FIG. 4 is at the same height as the terminal connecting portion 21, but a right area (second connection area 26) thereof shown in FIG. 4 is formed to be higher than the first connection area 25 via a step portion 27 provided between the first and second connection areas 25, 26 (see FIG. 3). The first and second connection areas 25, 26 are formed to extend in a longitudinal direction of the wire connecting portion 24 (longitudinal direction of each wire 11, 12) (see FIGS. 4 and 6).

As shown in FIGS. 1 and 3, the first wire 11 is placed in the first connection area 25 and the conductor 13 exposed at the end 11A of the first wire 11 is connected by ultrasonic welding. The second wire 12 is placed in the second connection area 26 and the conductor 14 exposed at the end 12A of the second wire 12 is connected by ultrasonic welding. That is, the second wire 12 including the thinner conductor than the first wire 11 to be connected at a low position (first connection area 25) on the wire connecting portion 24 is connected at a high position (second connection area 26) on the wire connecting portion 24.

The upper surface of the conductor 13 of the first wire 11 and that of the conductor 14 of the second wire 12 are flush with each other as shown in FIG. 3. Compression ratios (cross-sectional area of the conductor after welding/cross-sectional area of the conductor before welding) in the wire connecting portions 24 of the two wires 11, 21 are preferably 0.8 to 1.1 (80% to 110% in percentage). Further, a difference between the compression ratios of the two wires 11, 12 is preferably small.

Next, a method for manufacturing the terminal-wire assembly 10 of this embodiment is described.

Figure 7:
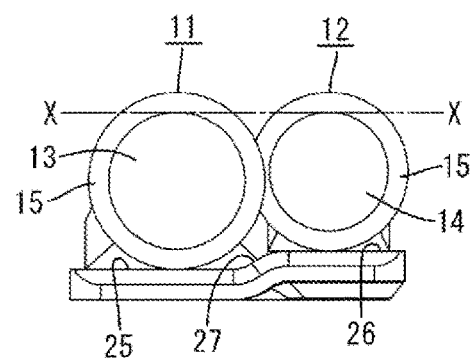
FIG. 7 is a rear view showing a state where wires are placed on the terminal.

The terminal 20 having a shape shown in FIG. 4 is prepared, and the insulation coatings 15 of the ends 11A, 12A of the respective wires 11, 12 are peeled and removed to expose the conductors 13, 14. Subsequently, as shown in FIG. 7, the wires 11, 12 are placed on the wire connecting portion 24 of the terminal 20. Specifically, the first wire 11 including the thicker conductor is placed in the first connection area 25 of the wire connecting portion 24 and the second wire 12 including the thinner conductor is placed in the second connection area 26. Then, the upper surface of the conductor 14 of the second wire 12 placed in the second connection area 26 and that of the conductor 13 of the first wire 11 placed in the first connection area 25 are aligned (see line X-X of FIG. 7).

Figure 8:
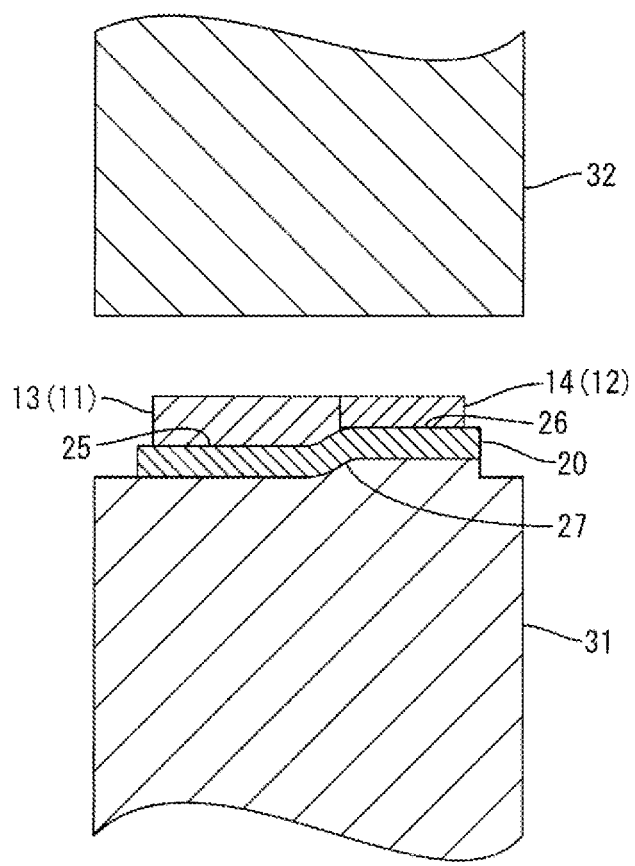
FIG. 8 is a section showing a state of welding the wires to the terminal.

The wire connecting portion 24 of the terminal 20 on which the respective wires 11, 12 are placed is set on a tool 31 for welding as shown in FIG. 8, and the respective conductors 13, 14 are connected to the wire connecting portion 24 of the terminal 20 by ultrasonic welding (welding step). Here, a tool 31 having such a cross-sectional shape as to be arranged along the wire connecting portion 24 of the terminal as shown in FIG. 8 is used as the tool 31 for welding and ultrasonic welding is applied with the terminal 20, on which the two conductors 13, 14 (wires 11, 12) are placed, sandwiched between the tool 31 and a tool 32 arranged on an upper side.

When ultrasonic welding is finished, the terminal-wire assembly 10 shown in FIG. 1 is obtained in which the two wires 11, 12 including the conductors 13, 14 having different thicknesses are connected side by side.

Next, functions and effects of this embodiment are described.

Since the wire connecting portion 24 of the terminal 20 is stepped in this embodiment, the first wire 11 including the thicker conductor 13 is arranged at the low position on the wire connecting portion 24 if the second wire 12 including the thicker conductor 14 is arranged at the high position (second connection area 26) on the wire connecting portion 24. In this way, a step between welding surfaces (upper surfaces, surfaces on a side opposite to the terminal) of the second wire 12 including the thinner conductor 14 and the first wire 11 including the thicker conductor 13 is made smaller and the welding surfaces are aligned. Thus, welding can be evenly applied.

Hence, according to this embodiment, a difference between the compression ratios (cross-sectional area of the conductor after welding/cross-sectional area of the conductor before welding) of the wires can be made smaller than when a plurality of wires including conductors having different thicknesses are arranged side by side and welded on a terminal having a wire connecting portion in the form of a flat plate. As a result, according to this embodiment, it is possible to provide the terminal 20, to which the plurality of wires 11, 12 including the conductors 13, 14 having different thicknesses are equally connectable, and the terminal-wire assembly 10.

Further, since the plurality of wires 11, 12 including the conductors 13, 14 having different thicknesses are connected to the wire connecting portion 24 by ultrasonic welding according to this embodiment, a connecting operation of the plurality of wires 11, 12 can be performed by a simple and low-cost method.

The present invention is not limited to the above described and illustrated embodiment. For example, the following embodiments are also included in the technical scope of the present invention.

Figure 9:
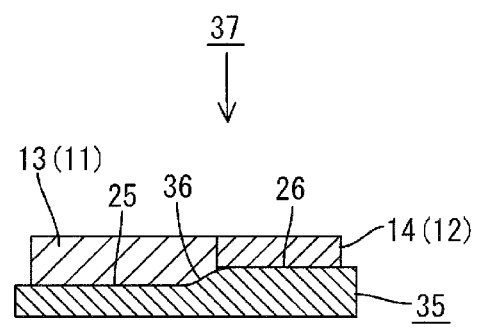
FIG. 9 is a section of a terminal-wire assembly described in another embodiment.
Figure 10:
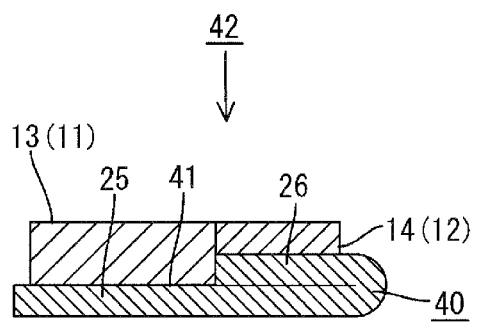
FIG. 10 is a perspective view of a terminal-wire assembly described in another embodiment.

Although the stepped connecting portion 24 is formed such as by striking in the above embodiment, a stepped connecting portion 36 may be provided by using a terminal 35 formed such that an area 26, in which the wire 12 including the thinner conductor 14 is to be connected, has a larger thickness as shown in FIG. 9 or a stepped connecting portion 41 may be provided by folding a terminal 40 in the form of a flat plate as shown in FIG. 10. Other components of terminal-wire assemblies 37, 42 shown in FIGS. 9 and 10 are substantially similar to those of the terminal-wire assembly 10 of the above embodiment although the connecting portions 36, 41 are formed in different ways. Thus, the same components are denoted by the same reference signs.

Although the terminal 20 formed with a step enabling welding to be applied with the heights of the conductors 13, 14 of the two wires 11, 12 aligned on the connecting portion 24 to the wires 11, 12 is illustrated in the above embodiment, a terminal formed with a step enabling center positions of a plurality of conductors to be aligned on a connecting portion to wires may be adopted.

Although the conductors 13, 14 and the terminal 20 are connected by ultrasonic welding in the above embodiment, a welding method is not limited to ultrasonic welding and another welding method may be adopted.

LIST OF REFERENCE SIGNS

10, 37, 42 . . . terminal-wire assembly
11 . . . first wire (wire)
11A . . . end
12 . . . second wire (wire)
12A . . . end
13, 14 . . . conductor
15 . . . insulation coating
20, 35, 40 . . . terminal
21 . . . terminal connecting portion
22 . . . terminal connection hole
24, 36, 41 wire connecting portion (connecting portion)
25 . . . first connection area (low position)
26 . . . second connection area (high position)
27 . . . step portion
31 . . . lower tool
32 . . . upper tool

The invention claimed is:

1. A terminal-wire assembly, comprising:
at least first and second wires arranged side-by-side and extending in a longitudinal direction, the first wire including a first conductor having a first thickness and the second wire having a second conductor with a second thickness smaller than the first thickness; and
a terminal including a wire connecting portion extending in the longitudinal direction, the wire connection portion having a first connection area and a second connection area arranged side-by-side in a direction normal to the longitudinal direction, a step portion formed between the first and second connection areas so that the second connection area is higher than the first connection area, wherein
the first wire is arranged on the first connection area and the second wire is arranged on the second connection area so that an upper surface of the first conductor and an upper surface of the second conductor are flush with each other.

2. A terminal-wire assembly according to claim 1, wherein the plurality of wires including the conductors having different thicknesses are connected to the connecting portion by ultrasonic welding.

3. The terminal-wire assembly of claim 1, further comprising a terminal connection portion extending from the wire extending portion and configured to be connected to a mating terminal.

4. The terminal-wire assembly of claim 3, further comprising a terminal connection hold for connecting the mating terminal formed in the terminal connection portion.

5. The terminal-wire assembly of claim 3, wherein a difference in a height of the first connection area and a height of the second connection area is substantially equal to a difference in the first thickness of the first conductor and the second thickness of the second conductor.

* * * * *